(12) United States Patent
McGrew

(10) Patent No.: US 6,505,525 B2
(45) Date of Patent: Jan. 14, 2003

(54) APPARATUS AND METHOD FOR INSPECTING LATERAL SEWER PIPES

(75) Inventor: R. Michael McGrew, Waukesha, WI (US)

(73) Assignee: Aries Industries Incorporated, Sussex, WI (US)

( * ) Notice: Subject to any disclaimer, the term of this patent is extended or adjusted under 35 U.S.C. 154(b) by 0 days.

(21) Appl. No.: 10/186,051

(22) Filed: Jun. 27, 2002

(65) Prior Publication Data

US 2002/0166396 A1 Nov. 14, 2002

Related U.S. Application Data

(63) Continuation of application No. 09/569,751, filed on May 12, 2000, now abandoned.

(51) Int. Cl.$^7$ .......................... G01N 21/00; H04N 7/18; F16L 55/18
(52) U.S. Cl. .......................... 73/865.8; 73/623; 348/82; 348/84
(58) Field of Search .................... 348/82, 84; 73/865.8, 73/623

(56) References Cited

U.S. PATENT DOCUMENTS

| | | | | |
|---|---|---|---|---|
| 2,909,975 A | * | 10/1959 | Ulrich | 33/314 |
| 2,971,259 A | * | 2/1961 | Hahnau et al. | 138/97 |
| 3,400,574 A | * | 9/1968 | Cramer | 33/1 H |
| 3,750,711 A | * | 8/1973 | Conklin et al. | 138/97 |
| 3,885,091 A | * | 5/1975 | Fish et al. | 348/164 |
| 3,958,607 A | * | 5/1976 | Gray | 138/93 |
| 4,107,738 A | * | 8/1978 | Van Norman | 348/84 |
| 4,197,908 A | * | 4/1980 | Davis et al. | 166/50 |
| 4,246,604 A | * | 1/1981 | Hundertmark et al. | 348/373 |
| 4,286,287 A | * | 8/1981 | Williams | 348/373 |
| 4,432,931 A | * | 2/1984 | Lockett | 348/84 |
| 4,442,891 A | * | 4/1984 | Wood | 166/55.2 |
| 4,484,602 A | * | 11/1984 | Guthrie | 138/93 |
| 4,577,388 A | | 3/1986 | Wood | 166/55 |
| 4,651,558 A | | 3/1987 | Martin et al. | 348/84 |
| 4,677,472 A | | 6/1987 | Wood | 348/84 |
| 4,701,988 A | | 10/1987 | Wood | 166/55.2 |
| 4,770,105 A | | 9/1988 | Takagi et al. | 104/138.2 |
| RE33,160 E | | 2/1990 | Guthrie et al. | 348/84 |
| 4,903,129 A | * | 2/1990 | Bell et al. | 348/565 |
| 4,974,168 A | * | 11/1990 | Marx | 348/125 |
| 4,991,006 A | | 2/1991 | Wood | 348/84 |
| 5,084,764 A | * | 1/1992 | Day | 348/84 |
| 5,318,895 A | | 6/1994 | Kahn et al. | 435/119 |
| 5,374,174 A | | 12/1994 | Long, Jr. | 156/287 |
| 5,423,230 A | | 6/1995 | Olander et al. | 73/865.8 |
| 5,457,288 A | * | 10/1995 | Olsson | 174/105 R |
| 5,571,977 A | | 11/1996 | Kipp | 73/865.8 |
| 5,790,185 A | * | 8/1998 | Auzerais et al. | 348/131 |
| 5,956,135 A | * | 9/1999 | Quesnel | 138/97 |
| 5,992,247 A | | 11/1999 | Manestar | 73/865.8 |
| 6,020,918 A | | 2/2000 | Murphy | 108/93 |
| 6,295,082 B1 | * | 9/2001 | Dowdy et al. | 348/231.99 |

FOREIGN PATENT DOCUMENTS

| | | | |
|---|---|---|---|
| DE | 2734556 | * | 2/1979 |
| DE | 2908351 | * | 9/1980 |
| JP | 08220620 A | * | 8/1996 |

* cited by examiner

Primary Examiner—Hezron Williams
Assistant Examiner—Michael Cygan
(74) Attorney, Agent, or Firm—Michael Best & Friedrich, LLP

(57) ABSTRACT

A self-propelled lateral inspection apparatus includes a body, a main camera fixed to the body, and a lateral camera movable with respect to the body into a lateral sewer pipe. A low frequency beacon is carried by the lateral camera or may be provided separately from the lateral camera. The beacon may be used to determine the position of the lateral camera in the lateral sewer pipe, or to map the lateral sewer pipe. A picture-in-picture processor is carried by the body, and permits an above-ground user to view video images from both the main and lateral cameras simultaneously on a single monitor screen.

16 Claims, 7 Drawing Sheets

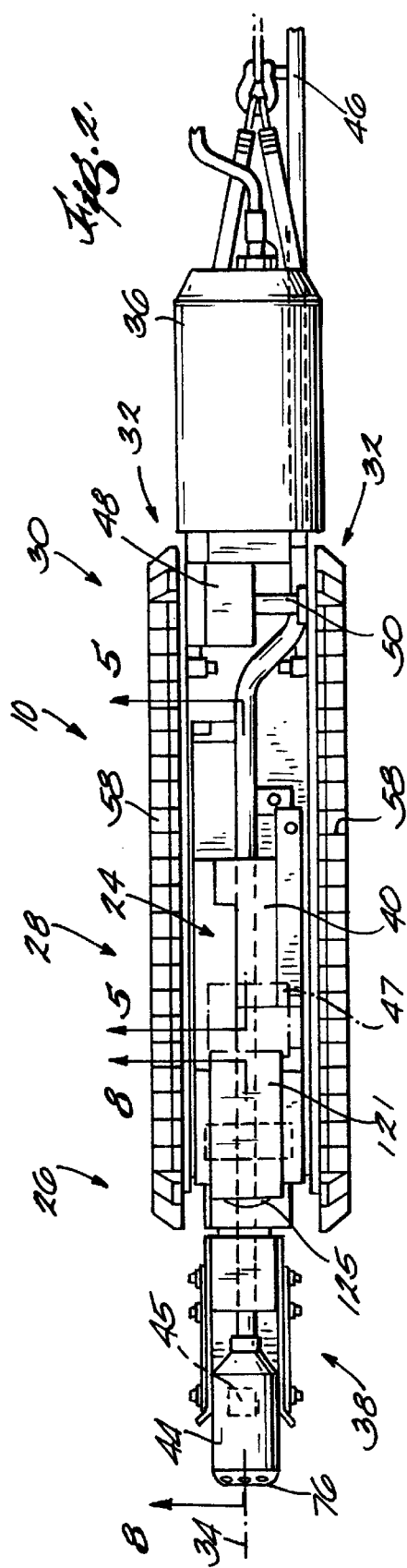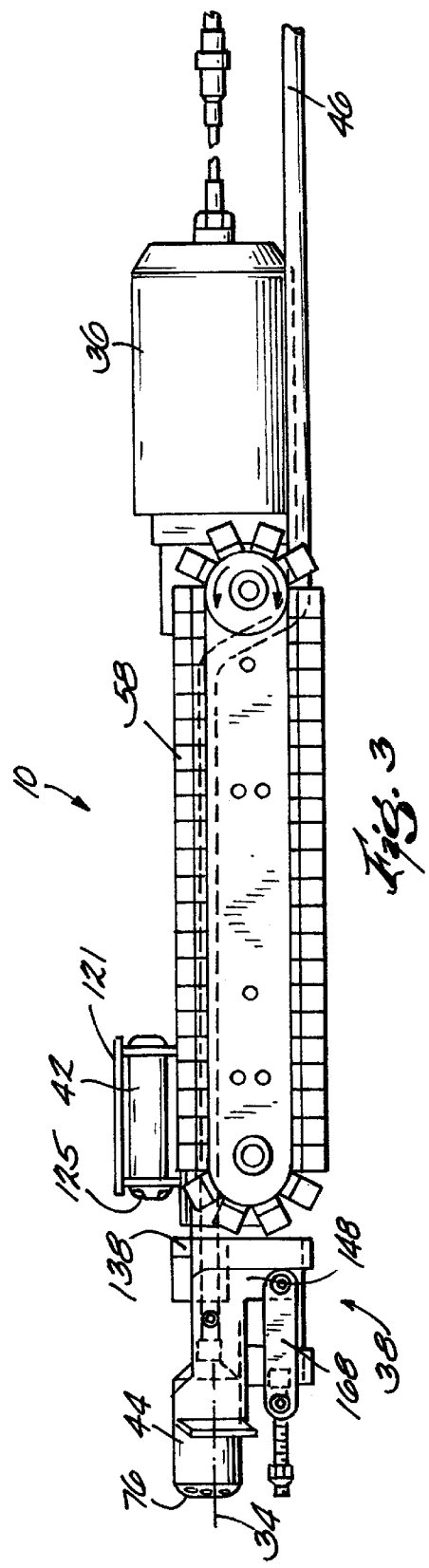

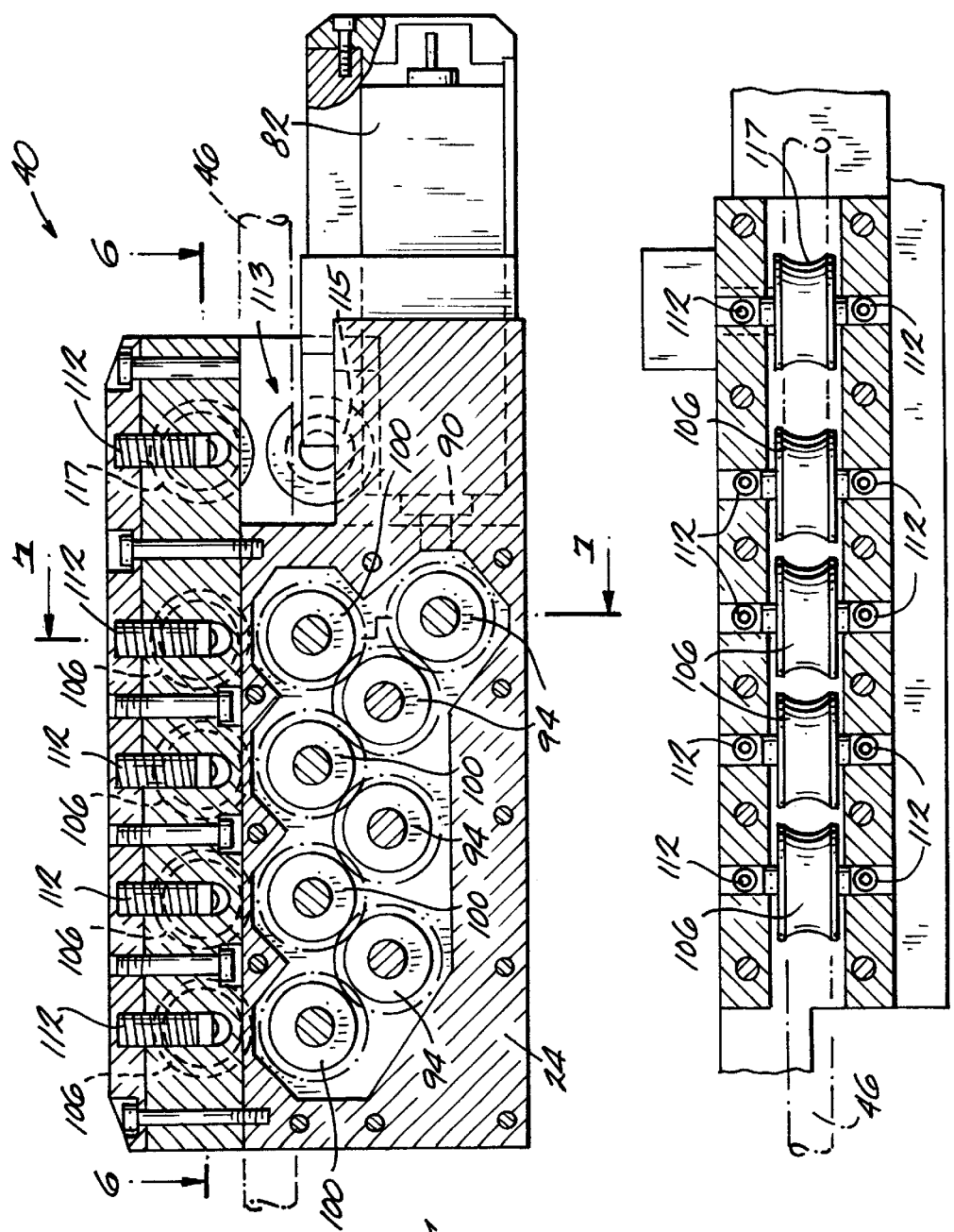

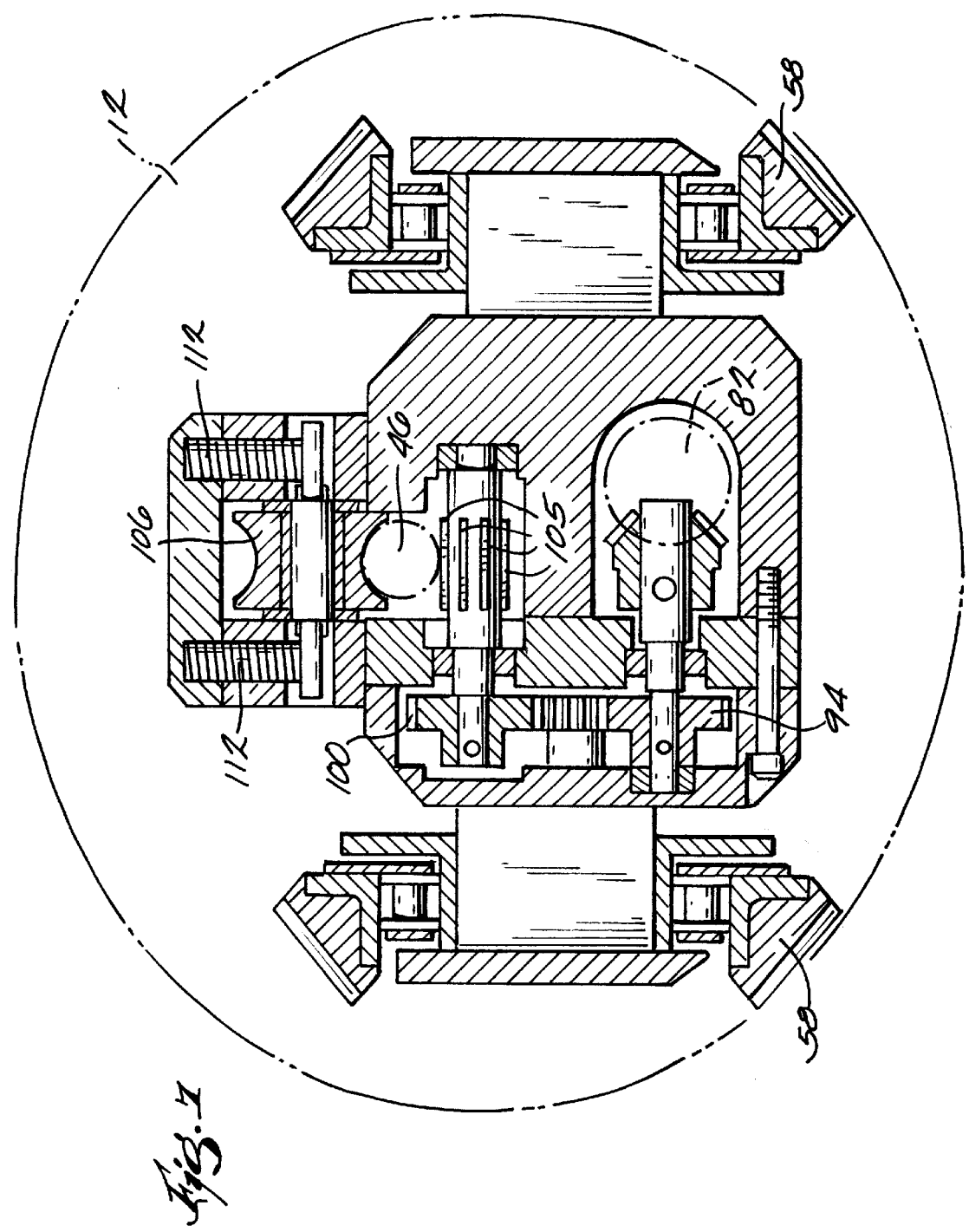

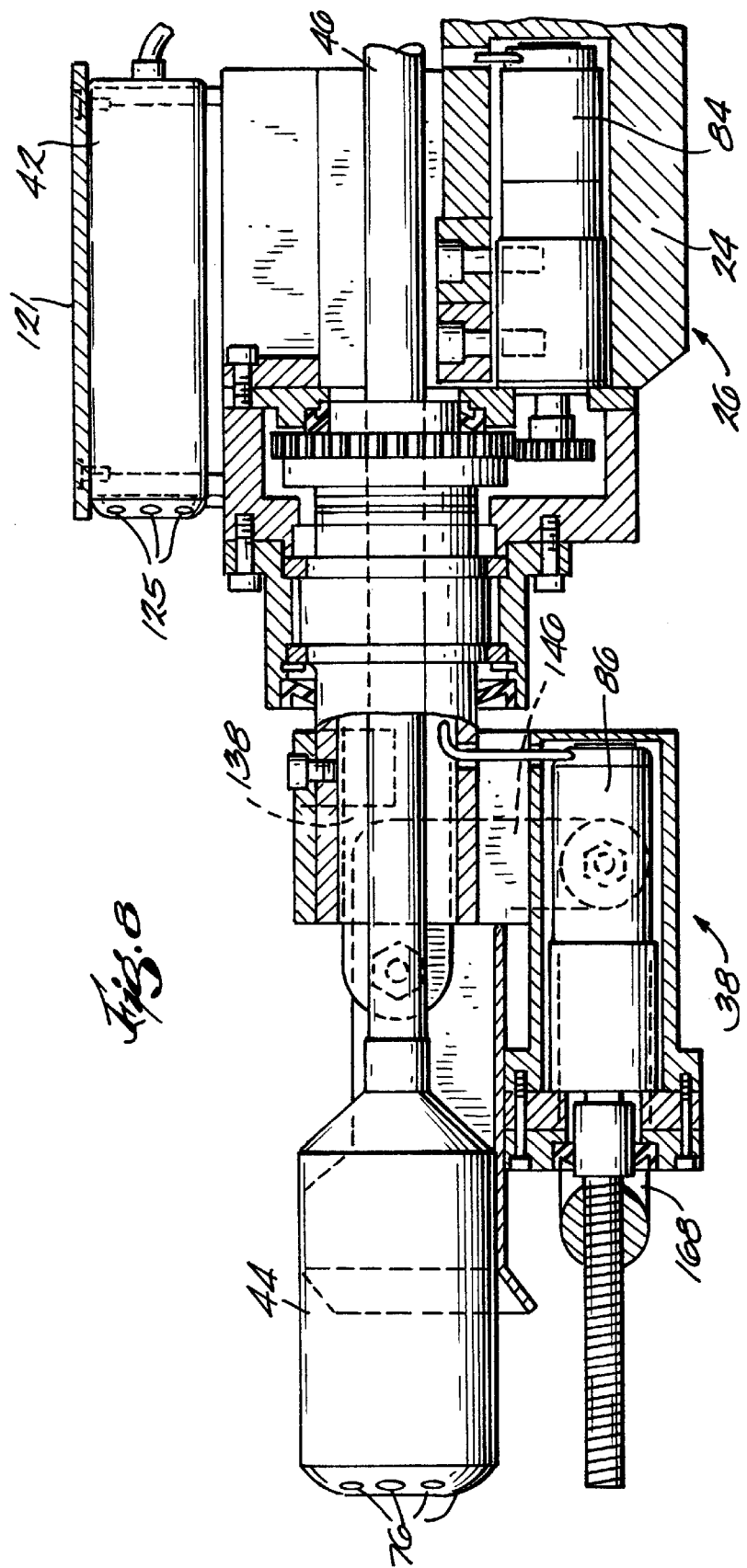

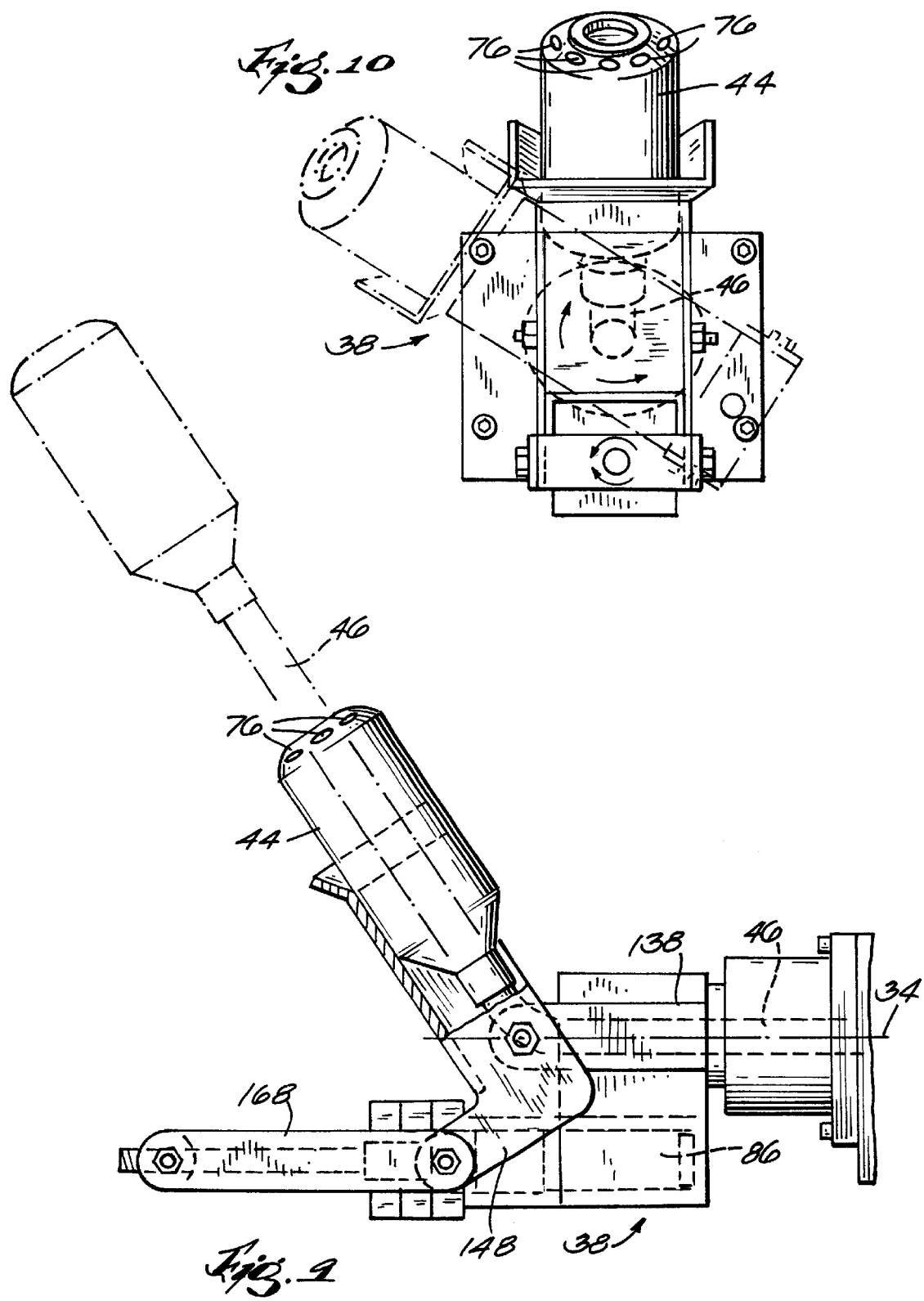

APPARATUS AND METHOD FOR INSPECTING LATERAL SEWER PIPES

This Patent Application is a continuation of U.S. patent application Ser. No. 09/569,751,filed May 12, 2000, now abandoned.

BACKGROUND

The invention relates generally to sewer interior video inspection devices and more particularly to devices for inspecting lateral sewer pipes.

A lateral inspection device is disclosed in U.S. Pat. No. 5,992,247 titled "Apparatus For Inspecting Lateral Sewer Pipes" and assigned to the Assignee of this application. The lateral inspection device disclosed in that patent includes a lateral camera, a main camera, and a self propelled sled for moving the cameras through a sewer main. The main camera is mounted on an adjustable chute which carries the lateral camera. The chute can be rotated to change the orientation of the lateral camera in the sewer lateral. Because the main camera is mounted on the chute, the main camera moves with the chute as the chute is moved to orient the lateral camera. An above-ground operator views the relative positions of the lateral camera and an opening to a lateral sewer pipe through the main camera. When the lateral camera is close to the lateral sewer pipe opening, the chute is moved to properly align the lateral camera with the opening to the lateral sewer pipe. The lateral camera is pushed into the lateral sewer pipe by a driven push rod. All the necessary electrical wiring for video and light power for the lateral inspection camera is carried by the push rod.

SUMMARY

Several problems with prior art lateral inspection devices, including the device described above, have been observed. The present invention addresses these problems and includes additional improvements over prior art lateral inspection devices.

One problem identified in the prior art is that the main camera is mounted on the launch chute for the lateral camera. Because of this prior art construction, the main camera is moved along with the chute with respect to the apparatus frame. Moving the main camera with respect to the frame of the apparatus may result in the disorientation of the above-ground operator and loss of the lateral pipe opening from the field of view of the main camera.

Another problem in prior art constructions is that the above-ground operator is only able to view images transmitted by one of the cameras at a time. There are often blockages in the lateral pipe requiring the apparatus to move back and forth to ram the lateral camera past the blockage. There are two primary concerns when trying to ram the lateral camera past a blockage. The first is to confirm when the lateral camera has cleared the blockage, and the second is to make sure that the apparatus has not moved significantly past the lateral pipe opening during the ramming procedure, which may result in snapping the push rod. The first concern is addressed by looking through the lateral camera, and the second is addressed by looking through the main camera. The prior art construction permits the above-ground operator to receive images from only one camera at a time. This hinders the process of moving the lateral camera past a blockage because of the constant switching between the cameras that is required.

Other improvements that could be made to prior art constructions include providing better lighting in the main pipe for the location of lateral pipe openings, providing better protection for the main camera in the event of a roll-over of the apparatus, providing a means for determining how far the lateral camera has advanced into the lateral pipe, and providing a means for mapping the lateral pipe underground to facilitate horizontal, underground drilling for utility lines and the like. As will be discussed below, each of these improvements are met by the present invention.

The present invention provides an apparatus that travels along an underground main pipe and that permits inspection of an underground lateral pipe. The apparatus includes a frame and main camera mounted on and fixed with respect to the frame. The apparatus also includes a lateral camera and/or a beacon. The lateral camera and/or beacon is moveable with respect to the frame and insertable into the lateral pipe by means of a push rod cable.

The beacon may be mounted on the lateral camera or provided independently on the push rod cable if no lateral camera is provided. The beacon emits a low frequency signal that penetrates the lateral pipe wall and the earth surrounding the lateral pipe. Preferably, the apparatus includes a receiver receiving the low frequency signal above ground and permitting location of the beacon within the lateral pipe. The beacon and receiver permit three-dimensional mapping of the lateral pipes.

A monitor is provided for the use of the above-ground operator. Preferably, the apparatus includes a picture-in-picture (PIP) processor mounted on the frame. The PIP processor permits the above-ground operator to display on the monitor images transmitted by both cameras simultaneously. This facilitates ramming the lateral camera past blockages in the lateral pipes, and also facilitates alignment and insertion of the lateral camera 44.

Preferably, the cameras include wide-angle lenses to maximize the field of view for the cameras at close ranges. Also, light emitting diodes (LED's) may be provided on each camera to facilitate viewing the inside of the pipes. Preferably, the LED's of both cameras can be simultaneously illuminated. The additional light from the lateral camera's LED's aids in finding the lateral pipe opening with the main camera. A shield is preferably mounted to the frame to protect the main camera from being physically damaged in the event of the apparatus rolling over in the main pipe.

Preferably, a meter is connected to the frame and is used to determine how much of the push rod cable has been inserted into the lateral pipe. The meter may include a Hall Effect sensor. An overlay generator mounted on the frame permits the output of the meter to be selectively displayed on the monitor over the video display.

BRIEF DESCRIPTION OF THE DRAWINGS

FIG. 2 is a top plan view of the apparatus.

FIG. 3 is a side elevational view of the apparatus.

FIG. 5 is a cross sectional view of a portion of the apparatus taken generally along line 5—5 in FIG. 2.

FIG. 6 is a cross sectional view of a portion of the apparatus taken generally along line 6—6 in FIG. 5.

FIG. 7 is a cross sectional view of a portion of the apparatus taken generally along line 7—7 in FIG. 5.

FIG. 8 is a partial side cross sectional view of a portion of the apparatus taken generally along line 8—8 in FIG. 2.

FIG. 9 is an enlarged side elevational view of the launch chute assembly of the apparatus.

FIG. 10 is an enlarged front elevational view of the launch chute assembly of the apparatus.

DETAILED DESCRIPTION

Before describing the preferred embodiment, it should be noted that not all of the structural and operational details of the preferred embodiment of this invention may be described in detail. Should additional details of that type be required, reliance is placed on the description and drawings in U.S. Pat. No. 5,992,247, the entire contents of which is incorporated herein by reference.

Figure 1:
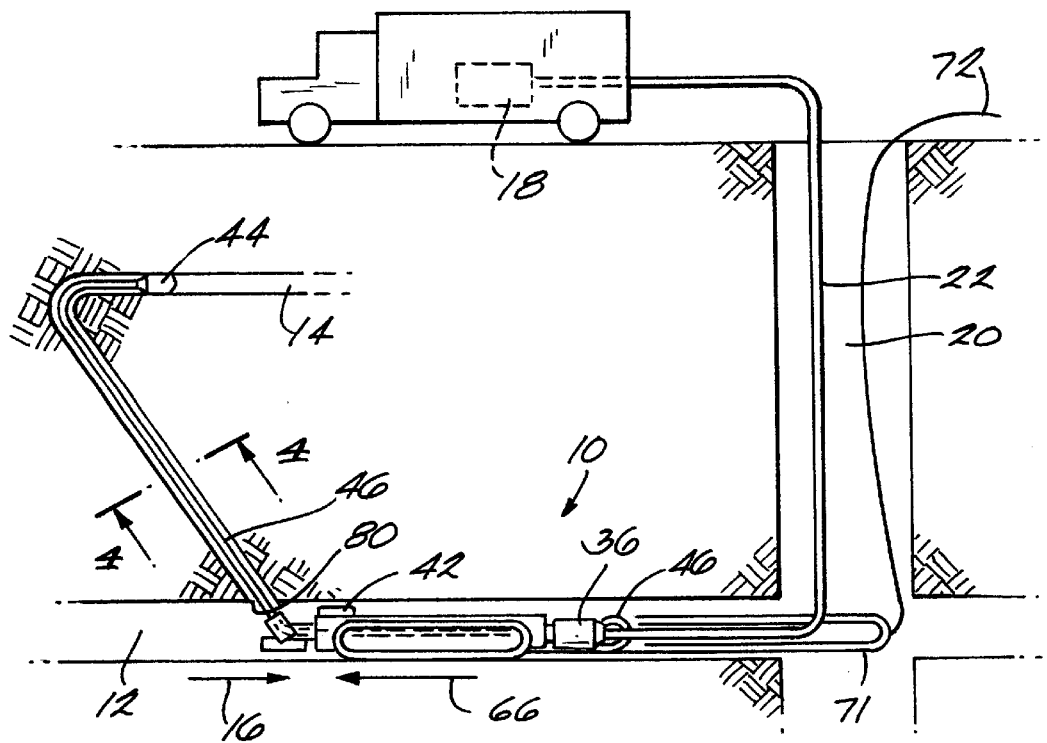
FIG. 1 is a side elevational view of the overall lateral inspection apparatus of the present invention disposed in a main sewer pipe and having the lateral inspection camera inserted into a lateral sewer pipe.

FIG. 1 illustrates a lateral inspection apparatus 10 being used in an intended environment including a main sewer pipe 12 and a lateral sewer pipe 14. The preferred apparatus 10 is sized for use in main sewer pipes 12 having a diameter as small as six inches, and a lateral sewer pipe 14 having a diameter as small as three inches. Sewage flows from the lateral sewer pipe 14 and through the main sewer pipe 12 in a downstream direction 16. A remote control station 18 is located in a mobile vehicle, and includes all controls necessary for an above-ground operator to use the lateral inspection apparatus 10. Specifically, the control station 18 includes a monitor for the display of a video signal, and a receiver for receiving a low frequency signal. The apparatus 10 may be used in piping for applications other than a sewer application as discussed herein. The remote control station 18 can also be provided in compact form that can be carried by an above-ground operator. The mobile remote control station 18 allows the lateral inspection apparatus 10 to be relatively easily set up and used at one segment of main sewer pipe 12, and then moved to another segment and again easily set up and used.

The lateral inspection apparatus 10, which in the preferred embodiment includes a tractor, is inserted into the main pipe 12 through a manhole or sewer access conduit 20 downstream of the lateral sewer pipe 14 to be inspected. A supply cable 22 interconnects the remote control station 18 with the tractor 10. As is conventional in these types of applications, the supply cable 22 includes all the power and video wiring for the various motors, cameras, and lights of the apparatus 10.

Referring to FIGS. 2 and 3, the apparatus 10 includes a frame or body 24 having a front portion 26, a middle portion 28, a rear portion 30, sides 32, and a longitudinal axis 34. A propulsion motor or tractor motor 36 is interconnected with the rear portion 30 of the frame 24. A launch assembly includes a launch chute assembly 38 interconnected with the front portion 26 of the body 24, and a drive assembly 40 (FIG. 5) interconnected with the middle portion 28 of the frame 24. A main camera 42 is fixed to and supported on the front portion 26 of the body 24 and a lateral camera 44 is supported by the launch chute assembly 38 in front of the main camera 42. A low frequency beacon 45 is mounted on or provided integrally with the lateral camera 44. The beacon 45 emits a low frequency (e.g., about 512 Hz) signal that passes through the walls of the pipes 12, 14, and is received by the receiver above ground at the control station 18. A push rod cable 46 is connected to the lateral camera 44. As will be described in greater detail below, a board assembly 47 carrying the apparatus circuitry is carried by the apparatus body 24.

The beacon 45 is useful to determine the location of the lateral camera 44 in the lateral pipe 14. As an alternative construction to the one illustrated, the beacon 45 may be provided independent of the lateral camera 44. This is a desirable construction when mapping lateral sewer pipes 14. Based on signals provided by the beacon 45, a three-dimensional map of the lateral pipes 14 may be made above ground. Such a map would be helpful to utilities, such as gas utilities, wishing to install conduits by horizontal drilling without digging up the ground. Without an accurate map of the lateral pipe system, it is possible to drill through a lateral sewer pipe 14, and lay a conduit, such as a natural gas conduit through the lateral pipe 14. Should someone attempt to clean the lateral pipe 14 with a snake or other tool, the conduit may be ruptured creating a hazardous condition. An accurate map of the lateral pipe system would help avoid such hazardous conditions.

As seen in FIG. 2, the propulsion motor 36 includes a power transmission 48 and a drive shaft 50. A suitable propulsion motor is a 1/3 hp motor provided by Minnesota Electric Technologies (MET) of Mankato, Minn. The propulsion motor 36 drives tractor treads or other friction members 58 to propel the apparatus along the length of the main pipe 12. The friction members 58 may be any means for propelling the apparatus 10 along the inside of the main pipe 12. For example, the friction members 58 may be suction cups, wheels, legs, rollers, claws, belts, or any other movable member that frictionally interacts with the main pipe 12 wall (see FIG. 7).

The details of the drive motor 36 and transmission are not shown in detail. For purposes of an understanding of this invention it is deemed sufficient to point out that the propulsion motor 36 is operable in a forward gear setting in which the propulsion motor 36 rotates the tractor treads 58 in a forward rotation direction. Forward rotation of the tractor treads 58 propels the tractor 10 in the upstream or forward direction 66 (see FIG. 1) that is generally opposite to the downstream direction 16. The propulsion motor 36 is also operable in a reverse gear setting in which the propulsion motor 36 rotates the tractor treads 58 in a reverse direction, propelling the tractor treads 58 in a reverse direction that is generally the same as the downstream direction 16. It is preferable for the forward direction 66 to be opposite the downstream direction 16, because the slant of the lateral pipes 14 (see FIG. 1) permits relatively easy insertion of the lateral camera 44 from the upstream direction 66.

Figure 4:
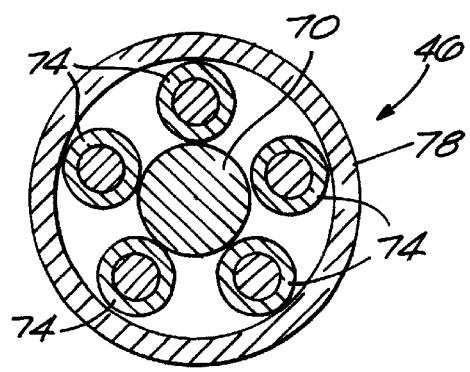
FIG. 4 is a cross sectional view of the push rod cable taken generally along line 4—4 in FIG. 1.

With reference to FIG. 4, the push rod cable 46 includes a core material 70 having a longitudinal compressive strength sufficient to push the lateral camera 44 into the lateral sewer pipe 14, and a transverse flexibility sufficient to negotiate bends encountered within the lateral sewer pipe 14. The push rod cable 46 extends out the rear end 30 of the tractor 10 and down the main sewer line 12. The push rod cable 46 is then joined with a highly-flexible cable 71 (see FIG. 1) containing the power and video transmission wiring for the lateral camera 44. The highly-flexible cable 71 loops back to the tractor 10. Although virtually any length of cables 46, 71 can be used, the preferred length is about a 75 foot push rod cable 46 and about a 75 foot highly flexible cable 71. The use of more push rod cable 46 than about 75 feet is made difficult due to frictional interaction between the push rod cable 46 and the lateral sewer pipe walls.

As seen in FIG. 1, a tag line 72 is interconnected with the end of the push rod cable 46 and is used to monitor the distance to which the push rod cable 46 has been inserted into the lateral sewer pipe 14. The tag line 72 may also be used to pull the push rod cable 46 and lateral camera 44 from the lateral sewer pipe 14, and to pull the tractor 10 out of the manhole 20 if necessary.

Referring again to FIG. 4, the push rod cable 46 also includes all necessary electrical and video transmission wiring 74 necessary to remotely operate the lateral camera 44. The lateral camera wiring 74 includes electrical power lines that supply power to an array of lateral camera lights 76 (see FIG. 3) and to the lateral camera 44. The lateral camera lights 76 are preferably an array of low power white light emitting diodes (LED's). The lateral camera wiring 74 is disposed along an outer surface of the core 70 and is encased by a resilient shell 78. Alternatively, the core 70 may be hollow, and may contain the wiring 74.

As illustrated in FIG. 1 and to some degree in FIGS. 2 and 3, the launch chute assembly 38 aligns the lateral camera 44 with a lateral sewer pipe opening 80, and the drive assembly 40 inserts and removes the push rod cable 46 and lateral camera 44 with respect to the lateral sewer pipe 14. The launch assembly includes three launch motors: a drive motor 82 (FIGS. 5 and 7); a rotate motor 84 (FIG. 8); and a tilt motor 86 (FIGS. 8 and 9). These motors 82, 84, 86 are solid-state bi-directional motors.

The drive assembly 40 is best illustrated in FIGS. 5–7. In the preferred embodiment, the drive motor 82 is a 10 Watt electric motor available from Micro Mo Electronics, Inc. of Clearwater, Fla., part number 3540K. The drive motor 82 is interconnected with a transmission that provides a power take-off shaft 90. The drive motor 82 is capable of rotating the power take-off shaft 90 in an insertion direction, which causes the push rod cable 46 to be inserted into the lateral pipe 14, and a retraction direction, which causes the push rod cable 46 to be pulled from the lateral sewer pipe 14.

Several gears 94 are driven by the power take-off shaft 90. These gears 94 in turn drive gears 100 that rotate shafts having drive gear teeth 105 (FIG. 7) that contact the push rod cable 46. Pressure rollers 106 are biased by springs 112 toward the shafts to sandwich the push rod cable 46 between the pressure rollers and the drive gear teeth 105. In the embodiment illustrated, there are four gears 94, four gears 100, and four pressure rollers 106.

Also provided is a meter or footage counter 113 (see FIG. 5). The footage counter includes a cable footage measure magnet wheel or rotor magnet 115. A roller 117, which may be substantially identical to the rollers 106 is biased with springs 112 to sandwich the push rod cable 46 between the roller 117 and the rotor magnet 115 to cause the rotor magnet 115 to rotated as the push rod cable 46 is inserted into or retracted from the lateral sewer pipe 14. The operation of the meter 113 will be described in more detail below.

As seen in FIGS. 1, 2, and 8, the main camera 42 is mounted on the front end 26 of the body 24, in a substantially horizontal orientation. A shield 121 is mounted to the body 24 and protects the main camera 42 from physical damage in the event of a roll-over of the apparatus 10. The main camera 42 includes a wide-angle lens to permit it to transmit a view of substantially the entire inner circumference of main pipe 12 in front of the apparatus 10. An array of lights 125 is provided on the front face of the main camera 42. Preferably, the lights 125 are an array of low voltage white LED's similar to those provided on the lateral camera 44. The power is preferably supplied to the arrays of LED's 76, 125 simultaneously and continuously to provide maximum lighting for navigating the main pipe 12 with the main camera 42. Power is also constantly provided to both cameras 42, 44 to facilitate quickly switching from one camera to the other and to enable the picture-in-picture feature discussed below.

Referring to FIGS. 8–10, the launch chute assembly 38 includes a first bracket 138 interconnected to the rotate motor 84 for rotation, a second bracket 148 defining a channel in which the lateral camera 44 is supported when in a fully retracted position, and a third bracket or pinion arm 168 that is connected at a first end to the second bracket 148. The brackets 138, 148, 168 are rotated and tilted with motors 84, 86, respectively, to orient the lateral camera 44 toward the opening 80 to the lateral pipe 14.

Figure 11:
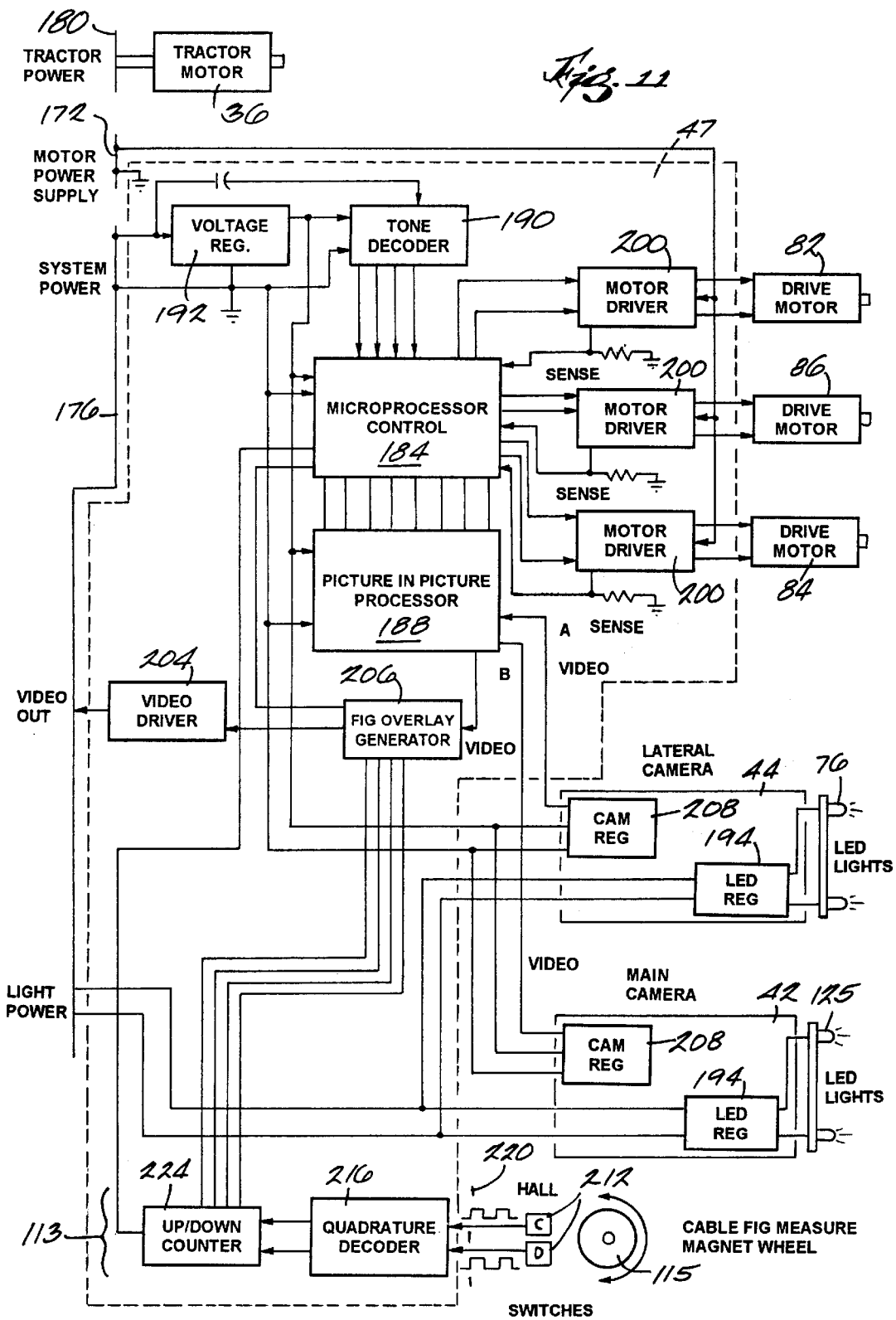
FIG. 11 is a schematic drawing of the electrical and video wiring of the apparatus.

FIG. 11 illustrates the electrical and video wiring of the tractor 10, a portion of which is mounted to the board assembly 47 identified above. The supply cable 22 includes a motor power supply line 172, a system line 176, and a tractor motor power line 180. The motor power supply line 172 supplies power directly to the motors 82, 84, 86, and the tractor motor power line 180 supplies power directly the tractor motor 36.

The system line 176 provides power to the cameras 42, 44 and lights 76, 125, and provides a video feed for the cameras 42, 44. The system line 176 also provides power to a microprocessor control unit or central processing unit ("CPU") 184, a picture-in-picture ("PIP") processor 188, and a tone decoder 190. Power to the lights 76, 125 is provided directly from the system line 176, while power to the CPU 184, PIP processor 188, and cameras 42, 44 is first passed through a voltage regulator 192 to provide the proper voltage. The cameras 42, 44 have internal circuitry including LED regulators 194 that control the operation of the lights 76, 125.

Tones are superimposed on the system power line 176 in response to operation of the control box in the control station 18. The tone decoder 190 translates the tones into control signals for the CPU 184. In response to the control signals, the CPU 184 controls the operation of the drive motor 82, tilt motor 86, and rotate motor 84. Operatively interconnecting the CPU 184 and each motor 82, 84, 86 is a motor driver 200. Interconnected or integrated with each motor driver 200 is an over-current sensor, which provides a feed-back control signal to the CPU 184. The over-current sensors use resistors to determine the current provided to the motor drivers 200. The current sensor shuts down and resets the associated motor 82, 84, 86 when the motor driver 200 is operating over a threshold current. In this regard, the current sensors protect the motors 82, 84, 86 from burning out due to an oversupply of current.

The video feed portion of the system line 176 communicates with the main and lateral cameras 42, 44 through a video driver 204, a footage overlay generator 206, and the PIP processor 188. The PIP processor 188 and overlay generator 200 operatively communicate with and are controlled by the CPU 184. The PIP processor 188 feeds a video signal to the video driver 204 through the overlay generator 206 pursuant to the CPU's 184 instructions. As will be discussed in detail below, the overlay generator 206 selectively provides a display over the video signal in response to a signal from the CPU 184.

The PIP processor 188 provides either the lateral camera video signal, which is labeled "A" in FIG. 11, the main camera video signal, which is labeled "B" in FIG. 11, or both signals A and B. When sending both signals A and B to the video driver 204, the PIP processor 188 is capable of making either A or B the large display screen image and the other signal the small image on the display screen. The video driver 204 ensures that the video signal is strong enough to be sent all the way to the control station 18 clearly.

The PIP processor 188 is preferably sufficiently sophisticated that it can control the cameras 42, 44 independently, without the signal of one camera being locked to the signal of the other camera. The cameras 42, 44 are therefore "non-genlocked" cameras, to use the applicable camera industry term. Non-genlocked cameras operate on separate frequencies and are independently controlled by a processor, rather than using a master-slave setup. The cameras 42, 44 include camera regulators 208 that permit parallel wiring of the cameras 42, 44, and that facilitate the picture-in-picture feature described above.

It should be noted that power is constantly provided to both cameras 42, 44 and the lights 76, 125, such that the cameras 42, 44 are always ready to feed a video signal, and such that the lights 76, 125 are always illuminated during use of the device 10. Also, the video signals from the cameras 42, 44 are always present to the PIP processor. The constant and simultaneous provision of power to the cameras 42, 46 and lights 76, 125, and the provision of both video signals to the PIP processor, facilitates switching between the cameras quickly. It also facilitates operation of the apparatus 10, as the lights 76 of the lateral camera 44 aid the operation of the main camera 42 in spotting the openings 80 to lateral pipes 14.

The meter or footage counter 113 is also schematically shown in FIG. 11. The rotor magnet 115 is rotated as the push rod cable 46 is inserted into or retracted from the lateral pipe 14. The rotor magnet 115 has a plurality of north and south poles magnetized therein. A pair of Hall switches 212, labeled "C" and "D" in FIG. 11, are positioned near the rotor magnet 115. The Hall switches 212 are on/off magnet switches that are turned on and off in response to the north and south poles of the rotor magnet 115 passing by them. In response to rotation of the rotor magnet 115, the Hall switches 212 generate a pulse train of square waves, which are fed into a quadrature decoder 216.

A reference line 220 illustrates that the square waves created by the switches 212 are 90° out of phase from each other. Depending on which wave reaches the decoder 216 first, the decoder 216 determines the direction of rotation of the rotor magnet 115, and thus, whether the push rod cable 46 is being inserted into the lateral pipe 14 or removed. The decoder 216 also counts the number of square waves received from the switches 212.

The decoder 216 sends both a wave count signal and a direction signal to an up/down counter 224. The counter 224 is operatively interconnected with and controlled by the CPU 184. Each time the CPU 184 turns on the counter 224, the counter 224 resets to a value of zero. The counter 224 converts the wave count from the decoder 216 into a linear distance traveled by the push rod cable 46 in tenths or some other fractional amount of a linear distance, such as a foot, yard, or meter.

The counter 224 relays a signal to the footage overlay generator 206, which is operatively interconnected with and controlled by the CPU 184. In response to tones generated by the above-ground user toggling a switch, the CPU 184 turns the overlay generator 206 on and off, causing the footage signal to be displayed on the monitor above ground.

Although particular embodiments of the present invention have been shown and described, other alternative embodiments will be apparent to those skilled in the art and are within the intended scope of the present invention. Thus, the present invention is to be limited only by the following claims.

What is claimed is:

1. A method of inspecting a lateral pipe from a main pipe with a pipe inspection apparatus including a frame movable within the main pipe, a lateral camera movable with respect to the frame and insertable into the lateral pipe, and a main camera mounted to the frame, the method comprising:
   providing a monitor;
   displaying images from the lateral camera and the main camera simultaneously on the monitor;
   maneuvering the inspection apparatus within the main pipe to a position proximate the lateral opening while simultaneously viewing the main camera and lateral camera images;
   aligning the lateral camera with the lateral opening while viewing the lateral camera images; and
   inserting the so-aligned lateral camera into the lateral pipe.

2. The method of claim 1, further comprising:
   positioning the lateral camera within the field of view of the main camera; and
   wherein said aligning step includes monitoring both the lateral camera and the lateral opening with the main camera while aligning the lateral camera with the lateral opening.

3. The method of claim 1, wherein the aligning step includes rotating the lateral camera about a longitudinal axis of the frame while viewing the lateral camera and the lateral opening in the image from the main camera.

4. The method of claim 1, wherein the displaying step includes simultaneously displaying images on a single monitor with a picture-in-picture processor.

5. The method of claim 1, wherein the inserting step includes inserting a cable with the lateral camera, the method further comprising measuring the amount of cable that has been inserted into the lateral pipe with a meter.

6. The method of claim 5, wherein the act of measuring includes measuring with a meter including a rotor magnet and a pair of Hall switches.

7. The method of claim 2, further comprising retracting the lateral camera and cable from the lateral pipe.

8. The method of claim 7, further comprising positioning the inspection apparatus within the main pipe near a second lateral pipe while simultaneously monitoring the main and lateral images, and inserting the lateral camera and cable into the second lateral pipe.

9. The method of claim 1, further comprising:
   inserting a beacon into the lateral pipe with the lateral camera;
   emitting a signal from a beacon connected to the lateral camera; and
   receiving the signal with a receiver to indicate the position of the lateral camera within the lateral pipe.

10. The method of claim 9, further comprising:
    mapping the lateral pipe from images provided by the lateral camera and main camera, and the position indicated by the beacon and receiver.

11. The method of claim 1, further comprising protecting the main camera from being physically damaged in the event of a roll-over with a shield mounted to the frame near the main camera.

12. The method of claim 1, further comprising illuminating the main pipe and the lateral pipe with LED's mounted on the main camera and the lateral camera.

13. The method of claim 1, wherein the act of providing includes providing a processor for simultaneously displaying images from the main camera and the lateral camera on the monitor.

14. The method of claim 1, wherein the act of providing includes providing a first monitor and a second monitor, and the act of displaying includes displaying the image from the lateral camera on the first monitor while simultaneously displaying the image from the main camera on the second monitor.

15. A method for inspecting a lateral pipe from a main pipe with a lateral inspection apparatus having main and lateral cameras, the method comprising:

viewing the main pipe with a main camera;

positioning the inspection apparatus near a lateral opening in the main pipe while viewing the image from the main camera;

aligning the lateral camera with the lateral opening while viewing the lateral camera and the lateral opening with the main camera;

inserting the lateral camera into the lateral pipe through the lateral opening; and viewing the lateral pipe with the lateral camera.

16. The method of claim 15, wherein said aligning step includes simultaneously viewing images from the main and lateral cameras.

* * * * *